United States Patent Office 3,438,759
Patented Apr. 15, 1969

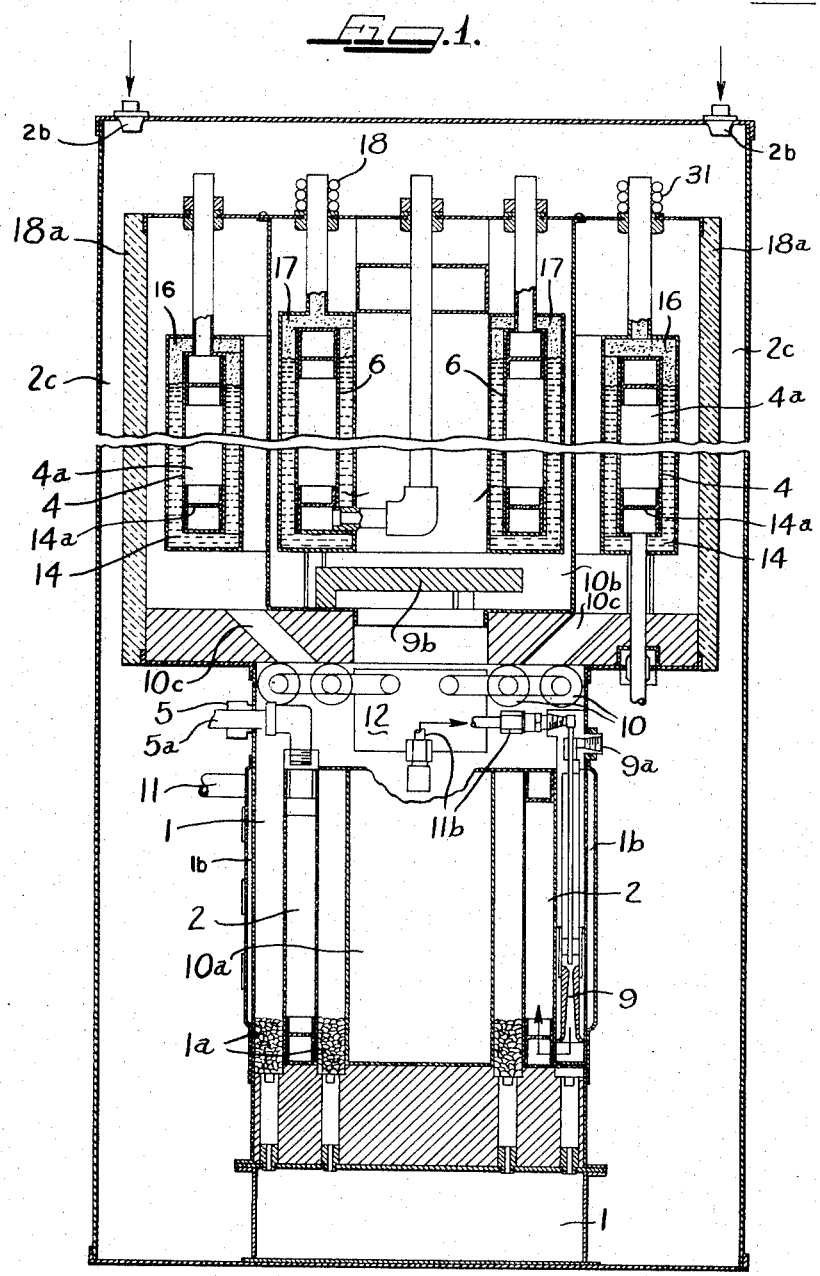

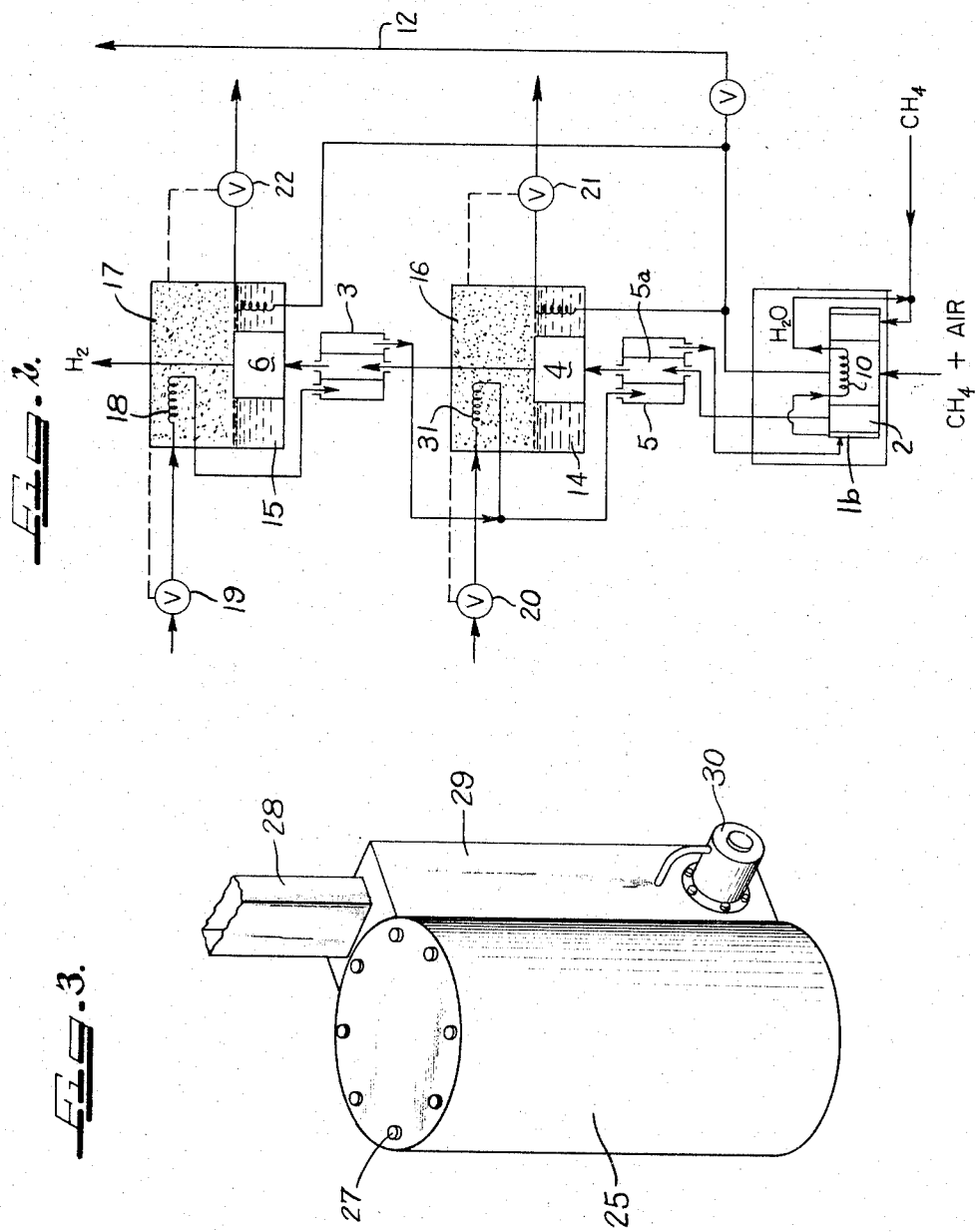

3,438,759
GAS REFORMER AND CONTROL MEANS
Henry R. Linden and Bernard S. Baker, Hinsdale, and John Meek and Arthur C. Allen, Chicago, Ill., assignors, by mesne assignments, of one-half to Consolidated Natural Gas Service Company, Inc., Pittsburgh, Pa., a corporation of Delaware, and one-half to Southern California Gas Company, Los Angeles, Calif., a corporation of California, and Southern Counties Gas Company of California, Los Angeles, Calif., a corporation of California, jointly
Filed Dec. 3, 1965, Ser. No. 511,452
Int. Cl. C10k 3/04; B01j 9/04
U.S. Cl. 48—196                                14 Claims

ABSTRACT OF THE DISCLOSURE

Apparatus and temperature control means for effecting steam reformation of gaseous hydrocarbons, particularly methane or natural gas, followed by carbon monoxide shift and methanation of the resultant gas to produce a hydrogen-rich gas with substantially no carbon monoxide. A plurality of reactors are staged and so positioned that waste heat from each higher temperature reactor is used to maintain the temperature of the next lower temperature reactor. Above the steam reformation section of the apparatus is located a jacketed carbon monoxide shift reactor and a jacketed methanation reactor. Jacketing fluids maintained at or near their boiling point serve as a means to control the temperature of each reactor. Heat is supplied to the reforming section by a gas burner and the exhaust flue gas serves first to heat the jacketing fluids and to maintain the shift and methanation reactors.

---

This invention relates to new apparatus and control means for the conversion of gaseous hydrocarbons, particularly methane or natural gas, to a hydrogen-rich gas suitable for use, for example, as fuel for an acid-type fuel cell. More particularly, the invention relates to new apparatus and temperature control means for effecting steam reformation of gaseous hydrocarbons, particularly methane or natural gas, followed by carbon monoxide shift and methanation of the resultant gas to produce a hydrogen-rich gas with substantially no carbon monoxide.

An integrated process for the conversion of methane or natural gas to an acid fuel cell quality hydrogen gas is described in copending application Ser. No. 337,796 filed Jan. 15, 1964, now abandoned in favor of copending application 701,036 filed Jan. 10, 1968. The process there described comprises three steps:

(1) High temperature (about 800° C.) steam reformation of natural gas;
(2) Low temperature (about 270° C.) carbon monoxide shift of effluent gas from the steam reformer; and
(3) Low temperature (about 180° C.) methanation of the residual carbon monoxide in effluent gas from the shift reactor, thus producing a hydrogen-rich gas substantially free of carbon monoxide.

The product gas resulting from the above 3-step process is thus high in hydrogen content, low in carbon monoxide and is suitable for use as a fuel for an acid-type fuel cell.

Reactions (2) and (3) above, i.e., the shift and methanation reactions, are relatively temperature sensitive. Hence, it is essential that precise temperature control be provided in the reactors where each of said reactions occur. At the same time, however, it is desirable that the apparatus used to effect the above 3-step process be integrated into a compact unit of simple and inexpensive construction, and capable of using the gaseous hydrocarbons as a source of thermal energy. In this way fuel cell quality hydrogen gas can be produced at remote locations by a single unit requiring no electrical energy from other sources. The requirement for simplicity and low cost dictates the straight forward nature of the control apparatus.

Proper temperature control of the methanation reaction is particularly important since, below a predetermined minimum no methanation will occur. On the other hand, if the temperature is too high, methanation of carbon dioxide as well as carbon monoxide will occur. Since methanation reactions of both carbon monoxide and carbon dioxide are exothermic, the large quantity of carbon dioxide present in the gas will give rise to excessive heat liberation and loss of temperature control of the system.

It is thus an object of this invention to provide an integrated hydrogen generation device operating from the same gaseous hydrocarbon as a heat source, preferably natural gas or methane, wherein the steam reformation, carbon monoxide shift and methanation reactions are all effected in a single compact unit.

It is a further object of this invention to provide an integrated apparatus having three reaction zones for generating hydrogen gas suitable for use in an acid type fuel cell wherein the heat provided to the three reaction zones, which operate at different temperatures, originates from a single heat source.

Another object of this invention is to provide a multistage hydrogen production unit wherein a gas rich in hydrogen is produced by steam reformation, carbon monoxide shift and methanation of natural gas or methane, wherein by proper staging and jacketing of the sections of the reactor, waste heat from one reactor section can be successively degraded and used to maintain subsequent sections at desired temperatures.

Yet another object of this invention is to provide a novel arrangement to control the temperature of both the second and final stages of a three stage reactor system wherein natural gas or methane is steam reformed, carbon monoxide shifted and methanated.

Another object of this invention is to provide the second and final stages of the reactor with a liquid bath arrangement to lend the temperature stability of a boiling fluid as temperature control means.

Other objects and advantages of this invention will appear as the invention is more fully described hereinafter.

Generally, the hydrogen generation unit of this invention comprises a steam reformation section above which is located a jacketed carbon monoxide shift reactor and a jacketed methanation reactor. The jackets contain liquids which are maintained at or near their boiling points to serve as means to control the temperature of each reactor. The jacketing fluids are preferably Dowtherm A and Dowtherm E which boil, at atmospheric pressure, at 254.4 and 178° C. respectively and thus maintain the shift reactor and methanation reactor at temperatures sufficient to effect reactions (2) and (3) above. Heat is supplied to the reforming section by a gas burner and hot exhaust flue gas is then cooled by generating process steam from water which is first directed in heat exchange relation through the Dowtherm liquids and serves as a temperature control means, hereinafter described in detail. The cooled flue gases from the steam boiler are then used to maintain the shift and methanation reactors at their operating temperatures by means of heat exchange with the Dowtherm liquids surrounding each reactor. Flue gas quantity supplied through heat exchangers to the constant-boiling Dowtherm liquids is controlled by means hereinafter described.

In the drawing,

FIG. 1 is a partial cutaway view in section of one embodiment of the invention illustrating the general configuration of apparatus as constructed from annular and generally circular shell type parts. This configuration is merely illustrative and in no way confines the variation in shape or form since many other arrangements are possible.

FIG. 2 is a diagrammatic illustration of the embodiment of the invention of FIG. 1 showing the control apparatus; and FIG. 3 is a perspective view of an integrated unit containing the three reactor sections of the invention.

Before describing the apparatus in detail, the overall process will be discussed and general apparatus requirements set out. Preferably the apparatus of the invention provides means whereby proportionately mixed steam and a gaseous hydrocarbon such as methane or natural gas, which mixture is caused to pass up through a hot catalytic bed of a steam reformer and emerge as hydrogen, carbon monoxide and carbon dioxide. The resultant reformed gas is cooled and passed into a shift reactor, where, in the presence of a catalyst and at the proper operating conditions, carbon monoxide is shifted and the resultant gas emerges predominately carbon dioxide and hydrogen with a small amount (less than 0.3 mole percent) of carbon monoxide.

For use as a fuel in acid-type fuel cells however, the carbon monoxide content of the resultant gas is too great and must be reduced as described in copending application Serial No. 337,796 filed Jan. 15, 1964. Therefore, the gas is again cooled and passed through a catalytic methanation reactor wherein substantially all the remaining carbon monoxide (typically less than 20 p.p.m. after the final process) is converted to methane. Such reduction in carbon monoxide content produces a final product gas which is suitable for use as fuel in an acid fuel cell. The methanation reaction may be selectively carried out with the proper combination of catalyst, space velocity and temperature as described in copending application Serial No. 337,796, filed January 15, 1964.

FIG. 1 shows the principal parts of one embodiment of the invention, it being understood that certain conventional equipment such as heat exchangers and piping are not shown in detail but are described hereinafter. Referring to FIG. 1, a gaseous hydrocarbon, preferably natural gas or methane, is admixed with air in 1 by means not shown and combusted in burner chambers 1a to heat reformer reactor 2, which is surrounded by chambers 1a and boiler 1b. Boiler 1b surrounds burner chambers 1a and water is boiled by heat in the chambers. Reactor 2, as well as boiler 1b, is heated by radiation of the fragmented ceramic in the burner chambers 1a (shown partially filled with ceramic) as well as by direct contact of the hot gas with the walls of the reactor. It should be understood that in the embodiment of FIG. 1, chambers 1 and reactor 2 are generally circular and that reactor 2 fills the annulus between the two portions of chambers 1a. Superheat coils 10 are connected to boiler 1b by piping (not shown) and may be placed above reactor 2 as shown in FIG. 1 or may be placed centrally with respect to the reactor in the space shown generally at 10a. The air used for combustion in furnace 1 is drawn into the apparatus through apertures 2b in the top as indicated in FIG. 1, and the air is preheated by passing along the annulus between the outer wall of the apparatus and the reaction sections shown generally at 2c. Burner 1 may be arranged such that hot gas passes up centrally through reactor 2 or the furnace may be designed as shown in FIG. 1 to completely surround reformer reactor 2 such that combustion occurs immediately adjacent the reformer reactor in ceramic-filled chambers. Reactor 2 is maintained at about 800° to 900° C.

Waste combustion gases passing out of contact with reactor 2 and over boiler 10 may then be fed out of the system through flue 12 which exists out the back of the reactor. Alternatively, the combustion may be directed around the shift reactor through ports 10c and the methanation reactor through passage 10b to provide heat to such reactors. The flow of gases through flue 12, ports 10c and passage 10b is controlled by butterfly valves (not shown) which open and close in response to changes in vapor pressures above the reactor heating fluids as hereinafter explained with regard to FIG. 2. The gases preferably are directed into heat exchange relation with the heating fluids of the shift and methanation reactors as shown diagrammatically in FIG. 2. In such event, control devices responsive to the vapor pressure above the heating fluids are used to limit the quantity of gas flow, such devices being hereinafter more fully described. A radiation shield 9b is provided above the reformer section to prevent radiation heating of the upper section.

Water is introduced to the unit through a valve (not shown) from a source (not shown) and is directed first through methanation cooler or condenser unit 18 and then the heat exchange annuli of tube 3 (shown diagrammatically in FIG. 2) and 5. The water then passes through line 11 to boiler 1b (shown partially in FIG. 1) where it is vaporized, directed through line 11b and superheated in coils 10.

The steam produced in superheater 10 is directed and used in aspirator 9 to induce a flow of methane or natural gas into the system at 9a whereupon a mixture of the steam and methane or natural gas passes up through the catalyst bed of reactor 2 and is reformed into carbon monoxide, hydrogen and carbon dioxide according to the reactions:

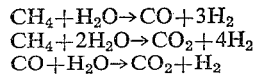

The reformed gases emerge from reactor 2 and pass through the central portion of heat exchanger 5a wherein they exchange heat with downflowing water. The gases then enter shift reactor 4 by means of suitable piping (not shown) where carbon monoxide is shifted to carbon dioxide according to the reaction:

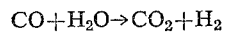

Shift reactor 4 consists of a vertically oriented annular assembly into which catalyst is distributed. At the bottom of this assembly is preferably an apertured ring 14a through which the gas stream flows and is evenly distributed through the catalytic bed 4a.

Surrounding the shift reactor is a bath of constant temperature boiling liquid 14 such as Dowtherm A or other suitable heating fluid which maintains the reactor at the temperature necessary to effect carbon monoxide shift. Upon leaving the shift reactor, the gas consists primarily of hydrogen and carbon dioxide with about 2000 to 3000 p.p.m. of carbon monoxide.

From shift reactor 4 the gas enters heat exchanger 3 (not shown in FIG. 1) in which it travels countercurrently to the downflowing water (FIG. 2) and exchanges heat therewith, after which the gas then passes into the methanation reactor 6 which is similar in design to reactor 4. In reactor 6 the carbon monoxide content is further reduced by the reaction:

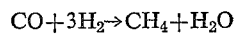

The hydrogen-rich gas then passes out of methanator 6 as shown at the top of FIG. 1 and contains 20 p.p.m. carbon monoxide or less and is suitable for use as fuel in said type fuel cells.

Since the temperatures of carbon monoxide shift reactor and the methanator must be precisely controlled, both reactors 4 and 6 are arranged to operate at fixed temperatures by the use of constant temperature boiling fluids 14 and 15. Vapor 16 from liquid 14 is in contact with condensor 31 whereupon the latent heat of the vapor is given to the process water.

Fluid 15 boiling at 178° C. maintains reactor 6 at constant temperature in order to effect almost complete methanation of any remaining carbon monoxide from the shifter section. Vapor 17 from boiling fluid 15 performs this function by condensing around the condensor unit 18 thereby maintaining the temperature of reactor 6 within close limits. Both reactors may be insulated as shown in FIG. 1 at 18a by any conventional insulating means.

As shown in the embodiment of FIG. 1, the means whereby the temperatures of the shift reactor and methanator are controlled are the constant temperature baths 14 and 15. The embodiment of FIG. 1 also shows that flue gases may be directed out of the system through flue 12 with no heat exchange contact with the shift or methanator reactors or alternatively may be directed around such reactors to heat fluids 14 and 15. Various temperature indicating means (not shown) are provided in the apparatus of FIG. 1.

To provide more effective temperature control of the shift and methanator hereinabove described they may be arranged as shown diagrammatically in FIG. 2. The numerals of FIG. 2 which are identical to those of FIG. 1 identify parts corresponding to similar parts of FIG. 1.

As shown in FIG. 2, there are provided two water flow control valves 19 and 20 which are regulated in response to the vapor temperatures in chambers 16 and 17. The control valves may be of any conventional kind which open and close the water line in response to changes in vapor pressures. Similarly, there are provided control means 21 and 22 in the gas flue line for controlling the amount of flue gas which passes through the shift and methanation reactor sections. Control means 21 and 22, similarly to 19 and 20, are responsive to the vapor pressure in chambers 16 and 17 and may be any conventional means such as a bellows arrangement which opens and closes a baffle in the flue line. Control means 21 and 22 are represented as valves in the flue lines of FIG. 2. As can be seen in FIG. 2, control means 21 and 22 are so arranged in the flue line that flue gas may be fed through the reactors in heat exchange relation to heating fluids 14 and 15 or may be shunted to an exhaust line 12 as necessary.

Water control valves 19 and 20 are arranged such that an increase in the temperature and thus pressure of vapors 16 and 17 cause an opening of the valve and an increase in water flow through heat exchangers 18 and 31 thus cooling the chambers containing vapors 16 and 17. Similarly, control valves 21 and 22 in the flue line are arranged such that flue gases are directed into heat exchange relation with fluids in reactors or shunted around the reactors in response to the vapor pressure in chambers 16 and 17. I.e., if the chambers are overheated, the valves close and shunt flue gas outside the reactor, whereas if the vapor becomes underheated and thus of reduced pressure, the valves open and permit flue gas to flow through the heat exchange fluid thus restoring the proper heating fluid temperature.

FIG. 3 is a pictorial view of a preferred apparatus embodying the invention. The three reactors are enclosed in a steel cylinder 25 of about 17 inches in diameter and about 40 inches high. The top plate may be secured by welding or preferably by bolts 27 which secure the top through flanges in the cylinder. Flue line 28 is enclosed in casing 29 which is bolted to cylinder 25. Air blower 30 serves to draw air from the atmosphere for combustion in the steam reformer furnace. It will be understood that the dimensions of cylinder 25 will depend upon the capacity desired and economic factors.

Those skilled in the art will recognize that various modifications may be made in the arrangement of the apparatus of the invention all within the scope of the invention. The embodiments shown in FIGS. 1 and 2 are not intended to be limiting but only to exemplify the invention and describe it in simplified terms. For example, the methanation reactor and bath as shown in FIG. 2 may be enclosed in vapor chamber 16. The arrangement of reactors in FIG. 2 is purposely simplified to show the control functions of the water and flue gas lines.

Having described our invention, we desire to be limited solely by the appended claims.

We claim:

1. An apparatus for continuous production of hydrogen-rich gas from gaseous hydrocarbons including a plurality of reactors which are staged and positioned so that waste heat from combustion to provide heat for the highest temperature reactor is used to maintain the temperature of the lower temperature reactors, comprising in combination:
   (a) means defining a first reactor for effecting catalytic steam reformation of said gaseous hydrocarbons to produce a first gas of substantially carbon dioxide, carbon monoxide and hydrogen,
   (b) means for combusting fuel to provide heat for said reactor and produce exhaust combustion gases,
   (c) means for exhausting combustion gases from said reactor heat producing means,
   (d) means defining a second reactor for effecting catalytic carbon monoxide shift of said first gas in communication with said first reactor to produce a second gas of substantially carbon dioxide and hydrogen with residual carbon monoxide,
   (e) means defining a third reactor for effecting catalytic methanation of said residual carbon monoxide in said second gas in communication with said second reactor to produce a third gas rich in hydrogen and substantially free of carbon monoxide,
   (f) means for retaining heat transfer liquid in communication with said second and third reactors, said retaining means having a portion defining a space above said liquid,
   (g) means for condensing vapors of said liquid in heat exchange relationship with said vapor space portion, and
   a portion of said combustion gases exhaust means being disposed in heat exchange relationship with said liquid retaining means to maintain said liquid near its boiling point,
   whereby said second and third reactors are maintained at substantially constant temperature.

2. An apparatus of claim 1 which includes:
   (h) means for control of the flow of exhaust combustion gases into said heat exchange relationship with said liquid retaining means, said control means being responsive to the vapor pressure of said liquid.

3. An apparatus of claim 2 further comprising:
   (i) means for providing steam to said steam reformation reactor.

4. Apparatus of claim 1 wherein said gaseous hydrocarbon is natural gas.

5. An apparatus of claim 1 which includes:
   (h) means for control of flow of a cooling fluid in said vapor condensing means, said control means being responsive to the vapor pressure of said heat transfer liquid.

6. An apparatus of claim 5 which includes:
   (i) means for providing steam to said steam reforming reactor, and wherein:
   said coolant fluid is water which after cooling said vapor is supplied to said steam providing means as process water.

7. An apparatus of claim 1 wherein:
   a separate liquid retaining means is in communication with each of said second and said third reactors.

8. An apparatus of claim 7 wherein:
   each of said liquid retaining means substantially encloses its respective reactor.

9. An apparatus of claim 8 wherein:
   each of said liquid retaining means contains a heat transfer liquid, and the liquid in association with said second reactor boils at a temperature higher than the liquid in association with said third reactor.

10. Apparatus for continuous production of hydrogen-rich gas from gaseous hydrocarbons comprising a steam reformation reactor for reacting the gaseous hydrocarbons and steam to produce a first gas of substantially carbon dioxide, carbon monoxide and hydrogen; a catalytic carbon monoxide shift reactor for reacting said first gas to produce a second gas of substantially carbon dioxide and hydrogen with residual carbon monoxide; a catalytic methanation reactor for reacting said second gas to produce a third gas rich in hydrogen and substantially free of carbon monoxide and suitable for use as fuel for an acid fuel cell; a gas-fueled furnace for heating said steam reformation reactor; a plurality of heating fluids at or near their boiling points in contact respectively with said shift and methanation reactors whereby said reactors are maintained at substantially constant temperatures; a first plurality of heat exchangers for contacting said heating fluids with exhaust combustion gas from said gas-fueled furnace; a water boiler adjacent said furnace and in heat exchange relationship to the path of exhaust combustion gas; a second plurality of heat exchangers for contacting water being fed to said boiler with said heating fluid; control means responsive to the vapor pressure of said heating fluids for regulating the flow of exhaust combustion gases through said first plurality of heat exchangers; and control means responsive to vapor of said heating fluids for regulating the flow of water through said second plurality of heat exchangers.

11. Apparatus of claim 10 wherein the gaseous hydrocarbon is natural gas.

12. In a continuous process for producing hydrogen-rich gas from gaseous hydrocarbons comprising the steps of (1) steam reforming said gaseous hydrocarbons to produce a first gas of substantially carbon dioxide, carbon monoxide and hydrogen (2) effecting catalytic carbon monoxide shift of said first gas to produce a second gas of substantially carbon dioxide and hydrogen with residual carbon monoxide, and (3) effecting catalytic methanation of said residual carbon monoxide in said second gas to produce a third gas rich in hydrogen and substantially free of carbon monoxide, the improvement comprising the added steps of:

(a) heating said shift and methanation steps (2) and (3) by transfer of heat from selected constant boiling temperature liquids;

(b) maintaining said liquids at a boiling temperature by transfer thereto of waste heat from the highest temperature reforming step (1), (c) cooling vapor from a body of said constant boiling liquids to below about the condensation temperature thereof, (d) returning vapor condensate to said liquid body, said maintaining step (b) and cooling step (c) being effected in relation to the vapor pressure of said constant boiling temperature liquids:

whereby said shift and said methanation steps are maintained within increasingly critical predetermined temperature limits respectively.

13. A method as in claim 12 wherein the constant boiling temperature liquid for said methanation step (3) is employed to cool said vapor of said constant boiling temperature liquid for said shift step (2).

14. A method as in claim 12 including the step of:

(e) preheating process water for said steam reforming step by passing it in heat exchange relationship with vapor of said constant boiling temperature liquid for said shift step (2).

References Cited

UNITED STATES PATENTS

| | | | |
|---|---|---|---|
| 2,465,235 | 3/1949 | Kubicek. | |
| 2,747,970 | 5/1958 | Rosenblatt | 23—2 |
| 3,088,919 | 5/1963 | Brown et al. | 252—373 XR |
| 3,194,644 | 7/1965 | Gorin et al. | 48—197 |
| 3,216,782 | 11/1965 | Cohn | 23—2 |

FOREIGN PATENTS 993,973  6/1965  Great Britain.

MORRIS O. WOLK, *Primary Examiner.*

R. E. SERWIN, *Assistant Examiner.*

U.S. Cl. X.R.

48—214